United States Patent [19]
Nelson

[11] Patent Number: 5,925,425
[45] Date of Patent: Jul. 20, 1999

[54] PLASTIC CLADDING AND BODY MOLDING PARTS

[76] Inventor: William A. Nelson, 51165 E. Village Building 12 Apt.102, New Baltimore, Mich. 48047

[21] Appl. No.: 07/896,290

[22] Filed: Jun. 10, 1992

Related U.S. Application Data

[51] Int. Cl.$^6$ .............. B32B 1/04; B32B 3/20; B60R 13/02; B60R 19/42
[52] U.S. Cl. ............ 428/31; 428/178; 428/187; 428/188; 428/343; 52/716.5; 293/128
[58] Field of Search ............. 428/31, 343, 178, 428/174, 187, 188; 293/128; 52/716.5

[56] References Cited

U.S. PATENT DOCUMENTS

| | | | |
|---|---|---|---|
| 4,246,303 | 1/1981 | Townsend | 428/31 |
| 4,360,549 | 11/1982 | Ozawa et al. | 428/31 |
| 4,515,649 | 5/1985 | Nussbaum | 428/31 |
| 4,563,374 | 1/1986 | Treber et al. | 428/31 |
| 4,567,068 | 1/1986 | Weinberg et al. | 428/31 |
| 4,592,937 | 6/1986 | Nagata et al. | 428/31 |
| 5,186,509 | 2/1993 | Tyves | 428/31 |
| 5,328,731 | 7/1994 | Zoller | 428/31 |

*Primary Examiner*—Blaine R. Copenheaver
*Attorney, Agent, or Firm*—Harness, Dickey & Pierce, P.L.C.

[57] ABSTRACT

Improved plastic cladding and body molding parts are provided. These improved parts incorporate at least one and preferably a plurality of large gas channels within the plastic part having corresponding attachment surfaces to allow easy and efficient attachment of the improved parts to a substrate surface. The large gas channels are designed to provide sufficient attachment surfaces so that the monolithic, one-piece plastic part can be attached directly to the desired substrate surface using an adhesive system. Preferably, the adhesive system is an adhesive tape applied directly to the attachment surfaces. More preferably, the adhesive is an acrylic plastic tape applied directly to the attachment surfaces. The improved plastic cladding and body molding parts are especially adapted and suitable for use in automotive applications. A method of attaching the improved plastic cladding and body molding parts to the substrate surface is also described.

23 Claims, 1 Drawing Sheet

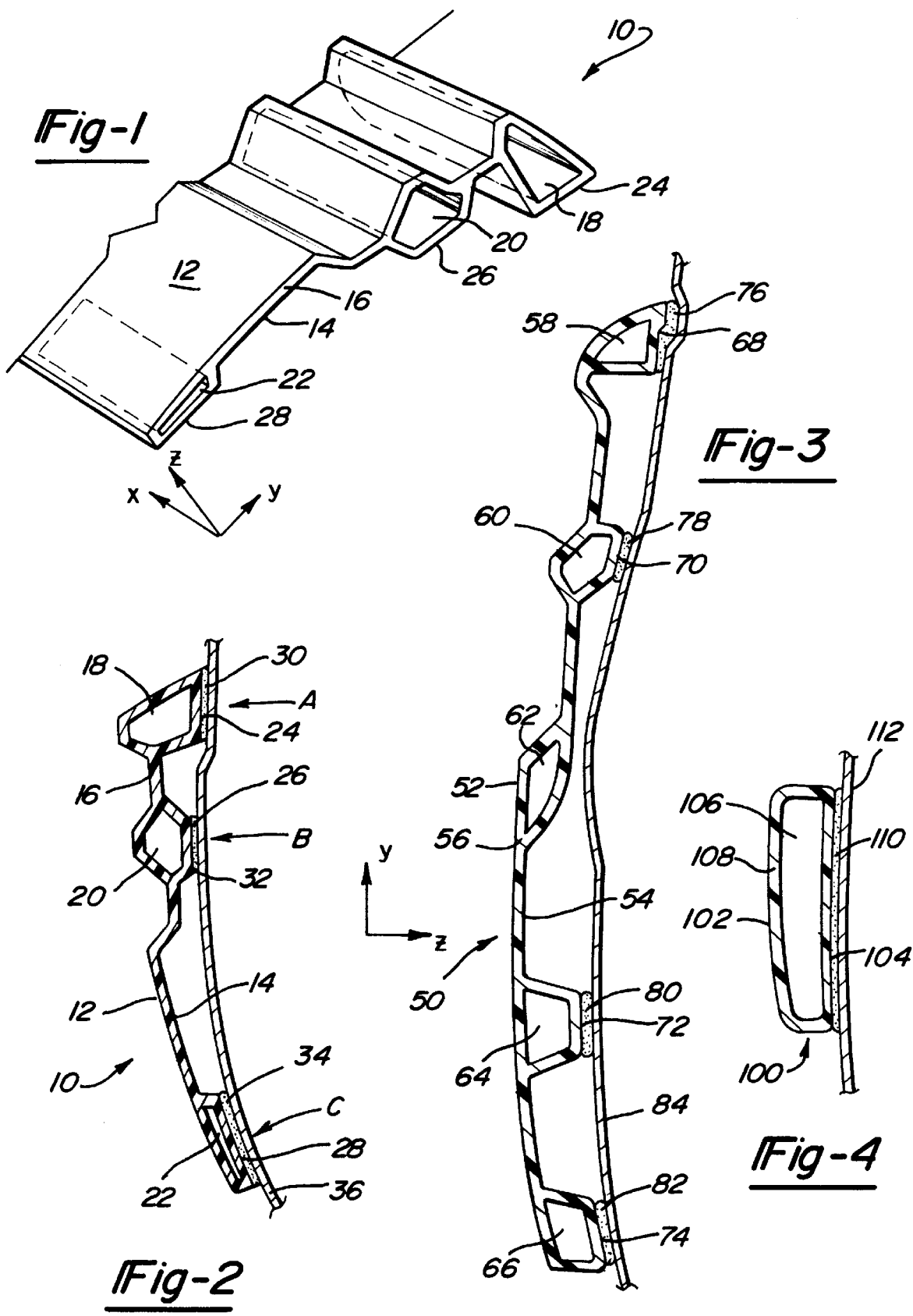

PLASTIC CLADDING AND BODY MOLDING PARTS

FIELD OF THE INVENTION

This invention relates to improved plastic cladding and body molding parts prepared by gas-assisted injection molding. These improved plastic cladding and body molding parts are suitable for attachment to various substrates through an adhesive system. The plastic parts of this invention have at least one, and preferably at least two, enlarged gas channels forming the adhesive attachment surfaces for attachment of the plastic part to the desired substrate surface. This improved plastic part eliminates the need for multiple plastic components and the processing steps required for forming the plastic part from the multiple plastic components. This improved plastic part also provides increased weight savings and should provide lower component failure rates for the ultimate consumer. The improved plastic part further provides increased design flexibility for automotive designers and manufacturers. The improved plastic parts of the present invention are ideally suited for use as plastic claddings and body moldings for automobiles. The one-piece plastic parts of the present invention can be easily attached to, for example, the side of an automobile using standard adhesives.

BACKGROUND OF THE INVENTION

Gas-assisted injection molding is generally the preferred method for the production of large and complicated parts without sink marks and the like in thick rib sections or complicated cross-sectional areas and for production of parts where weight reduction is important. Such parts include plastic cladding and body mold parts designed for the automobile industry. In gas-assisted injection molding these large and complicated parts are made of a hollow construction by injecting a gas into the interior of a part while it is being formed in a mold cavity. The gas injected into the interior of the mold cavity will follow the so-called "path of least resistance." As the molten plastic cools and hardens from the outside inwardly, the gas will penetrate the inner and thicker portions of the part which are generally softer and warmer. Thus hollow cavities are generally formed in the thicker sections where, for example, structural ribs and the like may be located. The pressurized gas also expands these hollow cavities thereby forcing the molten plastic outwardly to fill the mold cavity. If the gas pressure is maintained at a relatively high level while the plastic part cools, the surface finish of the plastic part will be greatly enhanced by the minimization or elimination of sink marks, depressions, or like imperfections. Such hollow cavities can also result in considerable weight savings in the finished plastic part. Prior to the present invention the role of the gas channels was generally limited to enhancing the surface appearance and/or weight reduction in the finished part.

The nominal diameter of the gas channels in prior art plastic parts such as plastic claddings and body moldings were generally less than about 0.25 inches. Such plastic claddings and body moldings in the prior art were a two-part plastic assembly. The outer surface of the plastic cladding or body mold parts was shaped to the desired configuration. Attached to that outer part—usually by heat staking or sonic welding—was an inner plastic part designed to fit within and bond to the outer plastic part and then to be affixed to the desired surface of the automobile. The actual attachment was obtained by bonding the inner plastic part to the automotive surface with metal or plastic fasteners, friction fitting, or adhesive systems. Thus, the prior art systems required the design and production of two injection mold cavities, the injection molding of two plastic parts, and the assembly of the inner and outer plastic parts. In addition to increased costs and complexity in the production process, the requirement of a two-part assembly results in increased weight of the assembled part which not only adds to the total weight of the resulting automobile but also increases the demands on the attachment system used. In some cases, the increased weight may become so large that the available attachment systems cannot be used; thus, there may be a design limitation on the resulting plastic cladding and body molding parts. As those skilled in the art will realize, a two-part assembly will generally be weaker and more prone to failure than a monolithic, one-piece part of similar design and outward appearance. In addition, the points of attachment of the two plastic parts in the assembly (i.e., the bonding of the inner and outer plastic parts together) represent additional potential failure points. Such failures in the plastic cladding and body molding parts in the automotive market can have a significant, immediate, and negative impact on consumers' perception of the quality and quality control of the particular automobile and its manufacturer.

It is desirable, therefore, to produce plastic cladding and body molding parts, especially for automobile applications, which are of monolithic, one-piece construction and which are suitable for, and designed for, direct attachment to the substrate surface. It is also desirable to produce such plastic cladding and body molding parts at a weight savings over comparable two-part plastic assemblies. It is also desirable to produce plastic cladding and body molding parts which are stronger and less prone to failure than the conventional two-part plastic assemblies currently in use. The present invention provides such plastic cladding and body molding parts. The plastic cladding and body molding parts of the present invention are especially adapted and suitable for use in automotive applications. These plastic cladding and body molding parts can be used in the interior or exterior of automobiles as well as in many other applications.

SUMMARY OF THE INVENTION

In accordance with this invention, improved plastic cladding and body molding parts are provided. These improved plastic parts incorporate at least one and preferably a plurality of large gas channels within the plastic part. The large gas channels are designed to provide sufficient attachment surfaces so that the monolithic, one-piece plastic part can be attached directly to the desired substrate surface using an adhesive system. Preferably and especially for automotive applications, the adhesive system is an adhesive tape applied directly to the attachment surfaces. More preferably for such automotive applications, the adhesive is an acrylic adhesive tape applied directly to the attachment surfaces. This invention also relates to a method of attaching the improved plastic cladding and body molding parts of the present invention to the appropriate surfaces of the substrate. Although the plastic parts and attachment method of the present invention are especially adapted for automotive applications, they can be used in many other environments and many other applications.

One object of the present invention is to provide a gas-assisted injection molded plastic article suitable for adhesive attachment to a substrate surface, said article comprising (1) an outer surface of generally convex shape and contoured to a desired configuration;

(2) an inner surface of generally concave shape; and (3) a plastic wall portion between the outer and inner surfaces having at least two large gas channels formed therein, wherein the large gas channels form attachment surfaces on the inner surface and wherein the attachment surfaces are contoured to match the substrate surface whereby an adhesive can be applied to the attachment surfaces for directly bonding the plastic article to the substrate surface.

Another object of the present invention is to provide a method for attaching a gas-assisted injection molded plastic part to a substrate surface, said method comprising (1) providing the gas-assisted injection molded plastic part having (a) an outer surface of generally convex shape and contoured to a desired configuration, (b) an inner surface of generally concave shape, and (c) a plastic wall portion between the outer and inner surfaces having one or more large gas channels formed therein, wherein the large gas channels form attachment surfaces on the inner surface and wherein the attachment surfaces are contoured to match the substrate surface;

(2) applying an adhesive to the attachment surfaces of the plastic part;

(3) applying the plastic part with applied adhesive to the substrate surface so that the adhesive will bond the plastic part to the substrate surface.

Still another object of the present invention is to provide a monolithic, one-piece thermoplastic molding adapted to be attached with an adhesive to a substrate surface, said monolithic, one-piece thermoplastic molding comprising an outer surface contoured to the desired shape, an inner surface, and a wall portion between the outer and inner surfaces having one or more large gas channels formed therein, wherein the large gas channels form attachment surfaces on the inner surface and wherein the attachment surfaces are contoured to match the substrate surface, whereby an adhesive can be applied to the attachment surfaces for directly attaching the monolithic, one-piece thermoplastic molding to the substrate surface.

These and other objects and advantages of the present invention will become apparent through the following description of the preferred embodiments of the invention and with reference to the drawings provided.

BRIEF DESCRIPTION OF THE DRAWINGS

FIG. 1 is a partial perspective and partial sectional view of a body molding of this invention.

FIG. 2 is a sectional view of the body molding of FIG. 1 through the y- and z-axes as applied to a substrate surface.

FIG. 3 is a sectional view of a body molding having large gas channels with attachment surfaces and other gas channels without attachment surfaces.

FIG. 4 is a sectional view of a body molding have one large gas channel as applied to a substrate surface.

The present invention is not to be limited to the details of construction and arrangement of parts as illustrated in the accompanying drawings as the invention is capable of other embodiments and of being practiced in various ways within the scope of the appended claims. Furthermore, the terminology used in this present specification is for the purpose of description and not of limitation.

DESCRIPTION OF THE PREFERRED EMBODIMENTS

This invention relates to improved plastic cladding and body molding parts and methods of attaching them to a substrate surface. The plastic cladding and body molding parts of the present invention are attached to the substrate surface by an adhesive placed between the substrate surface and the attachment surfaces of the plastic cladding and body molding parts. The attachment surfaces on the plastic part are formed and defined by large gas channels produced at the appropriate locations within the plastic part. Although the smaller and narrower plastic cladding and molding parts (i.e., generally less than a few inches wide) require only one large gas channel, it is preferred that the plastic cladding and body molding parts of this invention have at least two large gas channels with attachment surfaces. Even more preferably, especially for the larger plastic cladding and body molding parts, at least three large gas channels with attachment surfaces are formed within the part. As the size of the plastic cladding and body molding part increases, even more large gas channels with attachment surfaces may be preferred.

FIG. 1 illustrates a body molding 10 of the present invention suitable for use on the side and door panels of an automobile (not shown). Body molding 10 has an outside or exterior surface 12 of generally convex shape and an inner or interior surface 14 of generally concave shape with a plastic wall portion 16. The thickness of the wall portion 16 can vary considerable depending on the intended application and any weight restrictions for the part. For automotive side moldings, the thickness of plastic wall portion 16 will normally be in the range of about 2 to 6 millimeters although thinner or thicker walls sections can be used. The exterior surface 12 is contoured to the desired configuration based on the design criteria of the finished product and will be dictated, in large part, by aesthetic considerations of the finished product. Large gas channels 18, 20, and 22 are formed in the wall portion 16 at various locations. Each large gas channel (18, 20, and 22) has an attachment surface (24, 26, and 28, respectively) for adhesive attachment to a substrate surface 36 (FIG. 2). The body molding 10 shown in FIGS. 1 and 2 is a sectional portion of a longer plastic part. The actual length of the molding as well as its width and its offset from the substrate surface will be dictated by the particular application. For example, for use as automotive side or door body molding, the length (along the x-axis in FIG. 1) might range from a few feet or less up to five feet or more depending on the particular model. And the width (along the y-axis in FIG. 1) could vary from a few inches or less up to twelve inches or more. And the offset or depth (along the z-axis in FIG. 1) could vary from a half inch or less up to several inches or more. As one skilled in the art will realize, different applications (whether for different locations on a car or truck or for entirely different substrates) will require different lengths, widths, and offsets.

FIG. 2 shows the body molding 10 of FIG. 1 as attached to a substrate surface 36. (The sectional view of FIG. 2 is within the axial plane where x equals zero.) The exterior surface 12 forms the contoured surface that will be visible when the part 10 is mounted on the substrate surface 36. The inner surface 14 will not be visible when the part 10 is attached to the substrate 36 and need not, therefore, have as high a surface quality as surface 12. The plastic wall portion 16 contains the three large gas channels 18, 20, and 22. Each large gas channel 18, 20, and 22 has its corresponding attachment surface 24, 26, and 28, respectively. Each attachment surface is contoured to match the contour of the substrate surface 36 at the point of attachment. For example, in FIG. 2 attachment surface 24 should be slightly concave to match the curvature of the substrate surface 36 at location A. And attachment surface 26 should be essentially flat to match the flat portion B of the substrate surface. And attachment surface 28 should be slightly convex to match the convex portion C of the substrate surface 36. Thus, variations in the contour of the substrate surface 36 will require different shaped attachment surfaces. It is generally preferred that the attachment surfaces 24, 26, and 28 are essentially planar as shown in FIGS. 1 and 2. But as one skilled in the art will realize, the actual shape of the attachment surfaces will depend upon, and should match, the contour of the substrate surface where a particular attachment surface will be bonded. Adhesive layers 30, 32, and 34 are applied to attachment surfaces 24, 26, and 28, respectively, to effect the bonding of the plastic part 10 to the substrate surface 36.

As shown in FIGS. 1 and 2, the large gas channels 18, 20, and 22 run along the length of the molding (i.e., parallel to the x-axis). This will normally be the preferred configuration. But the large gas channels may, if desired, may run along the width of the molding (i.e., parallel to the y-axis) or even along diagonals relative to the x- and y-axes. As also shown in FIGS. 1 and 2, the outermost large channels (18 and 22) are located very near the top and bottom of the molding 10 (assuming substrate surface 36 in FIG. 2 is a vertical surface). This is the preferred configuration. As the width of the molding 10 increases, it is preferred that one or more large gas channels with attachment surfaces (such as channel 20 with attachment surface 26) be added between the outermost large gas channels 18 and 22 to provide additional strength and support for the plastic part 10 when attached to substrate surface 36. In some cases, more than one interior lager gas channel like 20 may be used to advantage.

Other gas channels—large and/or small—without attachment surfaces can be used in the plastic cladding and body molding parts of the present invention. Such channels without attachment surfaces can be used to add strength to the part and/or to reduce the weight. FIG. 3 shows a five-channel molding 50 with an outer surface 52, an inner surface 54, and a wall 56. Each of large gas channels 58, 60, 64, and 66 has an attachment surface 68, 70, 72, and 74, respectively. Adhesive layers 76, 78, 80, and 82 are applied to attachment surfaces 68, 70, 72, and 74, respectively, in order to adhere part 50 to substrate surface 84. Gas channel 62 does not have an attachment surface and is not, therefore, bonded directly to surface 84. Channel 62 is essentially used to increase the rigidity of molding 50 without a significant increase in weight. Additional channels such as 62 could be used if desired. These additional channels without attachment surfaces could be small gas channels or large gas channels or combinations thereof.

FIG. 4 illustrates a relatively narrow body molding 100 having only one large gas channel 106. The outer surface 102 forms the exterior of the body molding. The inner surface 104, which also forms the attachment surface, is contoured to match the substrate surface 112. Adhesive layer 110 is used to bond the body molding 100 to the substrate surface 112. Generally such body molding with only one large gas channel are limited to relatively narrow moldings (i.e., less than a few inches wide). And these narrow moldings can have more than one large gas channel for increased strength if desired.

Conventional adhesive systems can be used to bond the plastic part 10, 50, or 100 to substrate surface 36, 84, or 112, respectively. As those skilled in the art will realize, the actual adhesive used will depend, in large part, on the actual plastic used to form the part, the substrate material, and intended application. For example, there are many adhesives systems which are known to bond plastics to sheet metal. And if the substrate is a plastic material, suitable solvents could be used to bond the plastic part to the substrate as well as more conventional adhesives. The selection of suitable adhesives is within the skill of the art. For ease of application, adhesive tapes which can be directly applied to the attachment surfaces 24, 26, and 28 in FIG. 2 or attachment surfaces 68, 70, 72, and 74 in FIG. 3 or attachment surface 104 in FIG. 4 are preferred. Adhesive tapes are also preferred as they allow a more uniform and precisely controlled thickness of the adhesive layer in the finished assembly. Pressure sensitive adhesive systems and especially pressure sensitive adhesive tapes are generally preferred. Such adhesive tapes are available (or can be cut) to match and cover the attachment surfaces. Once applied to the attachment surfaces, the plastic part can be simply be pressed into place on the substrate surface. One especially preferred adhesive tape is an acrylic adhesive tape (Part No. 4214) available from 3M of St. Paul, Minn. Generally the thickness of the adhesive layer will be on the order of about 1 millimeter. Thinner or thicker adhesive layers can be used and in some cases may be preferred. Although pressure sensitive adhesives are preferred, other adhesive systems—such as those cured by heat or by reaction with atmospheric moisture and the like—can be used if desired. Such systems, if used, will generally require that the plastic part be held in place until sufficient bond strength has been obtained.

In some applications (and especially where the plastic part and the substrate have widely differing coefficients of thermal expansion), it is important that the adhesive is sufficiently flexible to allow movement between the plastic part and the substrate so that the adhesive bond will remain intact and strong over a wide temperature range. For example, the adhesive used to bond a body side molding to the sheet metal of an automobile should remain flexible and strong over a relatively wide temperature range. More rigid adhesives, which might fail under such temperature cycling, should be avoided in such applications. The above mentioned acrylic adhesive tape from 3M forms a sufficiently flexible adhesive layer to withstand such temperature cycling in automotive applications.

The large gas channels generally have a nominal diameter of about 0.37 inches or greater. By "nominal diameter" we mean the largest sectional dimension or dimensions (excluding its length) of the gas channel. For example, the nominal diameter of gas channels 18 and 22 in FIGS. 1 and 2 would essentially be measured along the z-axis and y-axis, respectively. And in FIG. 3, for gas channel 60 the nominal diameter can be measured along the z-axis and the y-axis. Preferably the large gas channels have a nominal diameter of between about 0.37 to 1.0 inches. The size of the large gas channels essentially determine the surface area of the attachment surfaces. Sufficient area must be available to provide adequate support and surface area for bonding the plastic part to the substrate surface.

Conventional plastics suitable for injection molding can be used to form the plastic cladding and body molding parts of the present invention. Preferred thermoplastics include thermoplastic olefins (TPOs) and thermoplastic urethanes (TPUs). Suitable substrates upon which the plastic cladding and body molding parts can be mounted include, without limitation, steel, stainless steel, sheet metal, aluminum, copper, and other metals, wood, plastics, fiberglass, glass, and the like. With the proper adhesive, the plastic cladding and body molding parts of the present invention can be affixed to essentially any substrate.

The plastic cladding and body molding parts of the present invention are prepared using conventional gas-assisted injection molding techniques and equipment. For example, suitable gas-assisted injection molding techniques and equipment include those described in U.S. Pat. Nos. 4,101,617 (Jul. 18, 1978), 4,855,094 (Aug. 8, 1989), 4,923,666 (May 8, 1990), 4,943,407 (Jul. 24, 1990), and 5,069,858 (Dec. 3, 1991), all of which are incorporated by reference. Other suitable gas-assisted injection molding techniques and equipment include, but are not limited to, those described in U.S. Pat. No. 5,200,127 entitled "Method and Apparatus for Gas Assisted Injection Molding," U.S. Pat. No. 5,304,058 entitled "Injection Nozzle," U.S. Pat. No. 5,306,134 entitled "Fluid Forcing Nozzle," U.S. Pat. No. 5,282,730 entitled "Retractable Gas Injection Pin for Injection Molding," U.S. Pat. No. 5,149,546 entitled "Improved Check Valve," U.S. Pat. No. 5,295,800 entitled "Injection Molding Control System," and U.S. Pat. No. 5,273,417 entitled "Improved Nozzle for Gas-Assisted Injection Molding," all of which are assigned to the same assignee as the present application and all of which are hereby incorporated by reference.

In practice the plastic cladding and body molding parts of the present invention are prepared by injecting a "short-shot" of molten plastic or thermoplastic into an appropriate mold cavity followed by the injection of a pressurized gas, preferably an inert gas such as nitrogen. The pressurized gas injected into the interior of the mold cavity will follow the so-called "path of least resistance." As the molten plastic cools and hardens from the outside inwardly, the pressurized gas will penetrate the inner and thicker portions of the part which are generally softer and warmer. Thus hollow cavities are generally formed in the thicker sections. By locating these thicker sections where the large gas channels are desired, the mold manufacturer can control the location of the large gas channels. The desired configuration or shape of the attachment surfaces are, of course, designed directly into the appropriate mold cavity surfaces. The pressurized gas also expands these hollow cavities thereby forcing the molten plastic outwardly to fill the mold cavity. The molded plastic part is then allowed to cool, the pressurized gas vented, and the mold opened to remove the part. In some cases it may be desired to leave a residual gas pressure (i.e., in the range of about 25 to 100 psi) in the large gas channels for increased strength and resistance to warpage.

For purposes of this invention, a "short-shot" of resin is an amount less than that required to fill the cavity. By adjusting the amount of resin injected into the cavity, the volume of the large gas channels as well as the wall thickness around the gas channels can be controlled. Injecting more resin will result in smaller gas channels and corresponding thicker walls around the channels. And injecting less resin will, of course, result in larger gas channels and corresponding thinner walls around the channels. The volume of the gas channels and the thickness of the walls can be varied to achieve acceptable weight and strength parameters in the resulting molded article. Knowing the desired size of the gas channels and wall thicknesses, the amount of injected resin necessary can be estimated using the measured volume of the mold cavity. Adjustments to the estimated value can be made by simple trial and error methods. Or such trial and error methods can be used alone to determine the appropriate size of the "short-shot."

Generally the pressurized gas can be injected into the molten plastic through the nozzle, sprue bushing, or runner. Or the molten plastic can be injected directly into the mold cavity. To help insure the proper formation of the large gas channels, it is generally preferred that the pressurized gas is injected directly into the mold cavity and it is even more preferred that the pressurized gas is injected directly into those portions of the mold cavity where the large gas channels are to be located. This last method helps insures that the pressurized gas reaches the areas of the mold cavity where the large gas channels are desired. The combined injector and ejector pins of U.S. Pat. No. 5,282,730 are especially suited for injecting pressurized gas directly into the portion of the mold cavity where the large gas channels are to be located. Of course, any method of injecting the pressurized gas can be used so long as the desired large gas channels are formed with their attachment surfaces. It is also preferred, in order to maintain the highest possible quality for the outer, visible surface of the plastic part (surface 12 in FIGS. 1 and 2, surface 52 in FIG. 3, and surface 102 in FIG. 4) that the pressurized gas is injected through the inner surface of the plastic part rather than through the outer surface. For example, in FIG. 2 the gas is preferably injected into the wall portion 16 through one or more of the attachment surfaces 24, 26, and 28.

That which is claimed is:

1. A gas-assisted injection molded plastic article suitable for adhesive attachment to a substrate surface, said article comprising:

a plastic wall having an outer surface of generally convex shape and contoured to a desired configuration and an inner surface of generally concave shape;

at least two gas channels in separate regions in the plastic wall, wherein the channnels bisect the plastic wall between said outer surface and said inner surface such that one part of the bisected plastic wall forms the outer surface of the plastic wall in the region of the channels and the opposing part of the bisected plastic wall forms the inner surface of the plastic wall in the channels;

attachment surfaces forming part of the surface in regions adjacent the gas channels, wherein the molded plastic article is dimensioned so that the gas channels are spaced apart along the plastic wall and are separated by non-bisected portions of the plastic wall; and a third gas channel without an attachment surface on an adjacent region of the inner surface.

2. A gas-assisted injection molded article suitable for adhesive attachment to a substrate surface, said article comprising:

a plastic wall having an outer surface of generally convex shape and contoured to a desired configuration and an inner surface of generally concave shape;

at least two gas channels in separate regions in the plastic wall, wherein the channels bisect the plastic wall between said outer surface and said inner surface such that one part of the bisected plastic wall forms the outer surface of the plastic wall in the region of the channels and the opposing part of the bisected plastic wall forms the inner surface of the plastic wall in the region of the channels, wherein the plastic wall that forms the gas channel regions and non-bisected regions has the same uniform thickness in both the gas channel regions and non-bisected regions; and attachment surfaces forming part of the inner surface in regions adjacent the gas channels, wherein the molded plastic is dimensioned so that the gas channels are spaced apart along the plastic wall and are separated by non-bisected portions of the plastic wall.

3. A plastic article as defined in claim 2, wherein at least three gas channels are present in separate regions in the plastic wall.

4. A plastic article as defined in claim 3, wherein the gas channels have a nominal diameter of about 0.37 inches or greater.

5. A plastic article as defined in claim 4, wherein the gas channels have a nominal diameter in the range of about 0.37 to 1.0 inches.

6. A plastic article as defined in claim 4, wherein the plastic article is a body molding and the substrate surface is an automobile.

7. A plastic article as defined in claim 4, wherein the attachment surfaces are essentially planar.

8. A plastic article as defined in claim 2, wherein the gas channels have a nominal diameter of about 0.37 inches or greater.

9. A plastic article as defined in claim 8, wherein the gas channels have a nominal diameter in the range of about 0.37 to 1.0 inches.

10. A plastic article as defined in claim 2, wherein the plastic article is a body molding and the substrate surface is an automobile.

11. A plastic article as defined in claim 2, wherein the attachment surfaces are essentially planar.

12. A monolithic, one-piece thermoplastic molding having an adhesive system, the molding comprising:
    a plastic wall having an outer contoured to a desired shape, an inner surface, a gas channel region, and a non-bisected region;
    a gas channel formed in the gas channel region of the plastic wall, the gas channel bisecting the plastic wall between said outer surface and said inner surface such that one part of the bisected plastic wall forms the outer surface of the plastic wall and the opposing part of the bisected plastic wall forms the inner surface of the plastic wall, the outer and inner surfaces of the plastic wall in the gas channel region and the plastic wall in the non-bisected region having substantially the same thickness, the thickness being uniform;
    an attachment surface forming part of the inner surface in a region adjacent to a gas channel, the attachment surface being contoured to match a substrate surface; and
    an adhesive system for attaching the molding to the substrate surface.

13. A monolithic, one-piece thermoplastic molding as defined in claim 12, comprising at least two of the gas channels and at least two of the attachment surfaces forming part of the inner surfaces in regions adjacent to the gas channels, and contoured to match the substrate surface.

14. A monolithic, one-piece thermoplastic molding as defined in claim 13, wherein the nominal diameter of the gas channel is greater than about 0.37 inches and the substrate surface is an automobile.

15. A monolithic, one-piece thermoplastic molding as defined in claim 13, wherein the thermoplastic molding is a gas-assisted injection molding part.

16. A monolithic, one-piece thermoplastic molding as defined in claim 13, wherein an adhesive is applied to the attachment surfaces.

17. A monolithic, one-piece thermoplastic molding as defined in claim 16, wherein the adhesive is an adhesive tape.

18. A monolithic, one-piece thermoplastic molding as defined in claim 17, wherein the adhesive tape is an acrylic adhesive tape.

19. A monolithic, one-piece thermoplastic molding as defined in claim 17, wherein the attachment surfaces are essentially planar.

20. A monolithic, one-piece thermoplastic molding as defined in claim 17, wherein the thermoplastic is a thermoplastic olefin or a thermoplastic urethane.

21. A monolithic, one-piece thermoplastic molding as defined in claim 13, wherein the attachment surfaces are essentially planar.

22. A monolithic, one-piece thermoplastic molding as defined in claim 13, wherein the thermoplastic is a thermoplastic olefin or a thermoplastic urethane.

23. A monolithic, one-piece thermoplastic molding as defined in claim 12, wherein the thermoplastic is a thermoplastic olefin or a thermoplastic urethane.

* * * * *

UNITED STATES PATENT AND TRADEMARK OFFICE
CERTIFICATE OF CORRECTION

PATENT NO. : 5,925,425
DATED : July 20, 1999
INVENTOR(S) : William A. Nelson

It is certified that error appears in the above-indentified patent and that said Letters Patent is hereby corrected as shown below:

Column 8, line 32, Claim 1, before "channels" please insert --region of the--.

Column 8, line 40, Claim 2, after "molded" please insert --plastic--.

Column 8, line 59, Claim 2, after "plastic" please insert --article--.

Column 9, line 22, Claim 12, after "outer" please insert--surface--.

Signed and Sealed this

First Day of February, 2000

Attest:

Q. TODD DICKINSON

Attesting Officer   Acting Commissioner of Patents and Trademarks